United States Patent
Ueno et al.

(10) Patent No.: US 11,451,110 B2
(45) Date of Patent: Sep. 20, 2022

(54) COMPRESSOR HAVING A TERMINAL GUARD PROVIDED OUTSIDE A CASING TO SURROUND A TERMINAL

(71) Applicant: DAIKIN INDUSTRIES, LTD., Osaka (JP)

(72) Inventors: Yasutaka Ueno, Osaka (JP); Hitoshi Shibata, Osaka (JP); Yuusuke Fujii, Osaka (JP)

(73) Assignee: Daikin Industries, Ltd., Osaka (JP)

( * ) Notice: Subject to any disclaimer, the term of this patent is extended or adjusted under 35 U.S.C. 154(b) by 111 days.

(21) Appl. No.: 17/040,841

(22) PCT Filed: Jan. 22, 2019

(86) PCT No.: PCT/JP2019/001837
§ 371 (c)(1),
(2) Date: Sep. 23, 2020

(87) PCT Pub. No.: WO2019/187541
PCT Pub. Date: Oct. 3, 2019

(65) Prior Publication Data
US 2021/0057960 A1 Feb. 25, 2021

(30) Foreign Application Priority Data

Mar. 26, 2018 (JP) .............................. JP2018-057675

(51) Int. Cl.
*H01R 13/52* (2006.01)
*H02K 5/22* (2006.01)
*F04D 29/40* (2006.01)

(52) U.S. Cl.
CPC ............. *H02K 5/225* (2013.01); *F04D 29/40* (2013.01); *H01R 13/52* (2013.01); *H01R 13/521* (2013.01); *H01R 13/5219* (2013.01)

(58) Field of Classification Search
CPC ............ H01R 13/5202; H01R 13/5205; H01R 13/521; H01R 13/5219; H01R 13/5221
See application file for complete search history.

(56) References Cited

U.S. PATENT DOCUMENTS 5,173,057 A * 12/1992 Bunch ................ H01R 13/5202
439/217
6,053,754 A * 4/2000 Kano ................. H01R 13/5221
439/281

(Continued)

FOREIGN PATENT DOCUMENTS

JP 63-123784 U 8/1988

OTHER PUBLICATIONS

European Search Report of corresponding EP Application No. 19 77 8367.3 dated Oct. 28, 2020.

(Continued)

*Primary Examiner* — Oscar C Jimenez
(74) *Attorney, Agent, or Firm* — Global IP Counselors, LLP (57) ABSTRACT

A compressor includes a casing, a terminal provided to the casing, a terminal guard and an insulating member. The terminal includes a body section and a terminal rod inserted through the body section. The terminal guard is provided outside the casing to surround the terminal. The terminal guard includes a side wall facing the terminal rod in a radial direction. The insulating member is disposed inside the terminal guard. The insulating member includes a bottom section covering an area around the body section, and a side section integrally provided in an erected manner on a peripheral edge portion of the bottom section. The side section covers an inner surface of the side wall of the terminal guard.

10 Claims, 4 Drawing Sheets

(56) References Cited

U.S. PATENT DOCUMENTS

| | | | | |
|---|---|---|---|---|
| 6,341,983 B1* | 1/2002 | Crawford | ........... | H01R 13/5208 |
| | | | | 439/275 |
| 6,372,993 B1* | 4/2002 | Eckels | ................. | H01R 13/521 |
| | | | | 439/282 |
| 8,610,005 B2* | 12/2013 | Iida | .................... | B60R 16/0239 |
| | | | | 439/364 |
| 9,608,363 B2* | 3/2017 | Greene | ............. | H01R 13/5202 |
| 2003/0157831 A1* | 8/2003 | Quadir | ................. | H01B 17/306 |
| | | | | 439/587 |

OTHER PUBLICATIONS

International Search Report of corresponding PCT Application No. PCT/JP2019/001837 dated Mar. 19, 2019.
International Preliminary Report of corresponding PCT Application No. PCT/JP2019/001837 dated Oct. 8, 2020.

* cited by examiner

COMPRESSOR HAVING A TERMINAL GUARD PROVIDED OUTSIDE A CASING TO SURROUND A TERMINAL

CROSS-REFERENCE TO RELATED APPLICATIONS

This U.S. National stage application claims priority under 35 U.S.C. § 119(a) to Japanese Patent Application No. 2018-057675, filed in Japan on Mar. 26, 2018, the entire contents of which are hereby incorporated herein by reference.

BACKGROUND

Field of the Invention

The present disclosure relates to compressors.

Background Information

Conventionally, a compressor includes a terminal that is provided to a casing, an overload relay that is provided to the casing and adjacent to the terminal, and a terminal cover that covers the terminal and the overload relay (for example, see JP S63-123784 U).

A gasket is disposed between the casing and the terminal cover. A protrusion that extends along a peripheral edge of the gasket is provided on an upper surface of this gasket. The protrusion is located closer to the peripheral edge of the gasket than a side wall of the terminal cover is and is in contact with an outer surface of the side wall.

CITATION LIST

Patent Literature

Patent Literature 1: JP S63-123784 U

SUMMARY

In the above-described conventional compressor, since the protrusion is disposed outside the side wall of the terminal cover, for example, water is retained on an apical end surface of the protrusion. As a result, there is a possibility that water outside the terminal cover enters the inside of the terminal cover through the gap between the protrusion and the side wall of the terminal cover.

Therefore, the conventional compressor has a problem in that water that has entered the inside of the terminal cover contacts the terminal, which causes a short circuit in the terminal.

The present disclosure aims to provide a compressor that can reduce the risk of a short circuit in a terminal.

A compressor according to the present disclosure includes
a casing,
a terminal that is provided to the casing and includes a body section and a terminal rod inserted through the body section,
a terminal guard that is provided outside the casing to surround the terminal, and includes a side wall facing the terminal rod in the radial direction, and
an insulating member that is disposed inside the terminal guard,
in which the insulating member includes
a bottom section that covers an area around the body section, and
a side section that is integrally provided in an erected manner on a peripheral edge portion of the bottom section and covers an inner surface of the side wall of the terminal guard.

According to the above-described configuration, since the side section of the insulating member covers the inner surface of the side wall of the terminal guard, the risk of a short circuit in the terminal can be reduced.

In one aspect of the compressor,
the height of the side section of the insulating member is substantially identical to the height of the side wall of the terminal guard.

Here, the case where the height of the side section of the insulating member is substantially identical to the height of the side wall of the terminal guard includes not only a case where the height of the side section of the insulating member is identical to the height of the side wall of the terminal guard, but also includes a case where the height of the side section of the insulating member is slightly higher than the height of the side wall of the terminal guard or slightly lower than the height of the side wall of the terminal guard due to a manufacturing error, for example.

Furthermore, in the case where the height of the side section of the insulating member is slightly higher than the height of the side wall of the terminal guard, the value obtained by subtracting the height of the side wall of the terminal guard from the height of the side section of the insulating member is, for example, 1.0 mm or less.

Furthermore, in the case where the height of the side section of the insulating member is slightly lower than the height of the side wall of the terminal guard, the value obtained by subtracting the height of the side section of the insulating member from the height of the side wall of the terminal guard is, for example, 1.6 mm or less.

According to the aspect, it is possible to reduce the possibility that the terminal rod contacts the side wall of the terminal guard when the terminal rod comes off from the body section.

In one aspect of the compressor,
a terminal chamber is defined by the casing and the terminal guard, and
90% or more of a surface area of a metal portion facing the terminal chamber is covered with the insulating member.

Here, the metal portion means a metal portion other than the terminal rod, the metal portion facing the terminal chamber.

According to the aspect, it is possible to reduce the possibility that the terminal rod contacts the metal portion facing the terminal chamber when the terminal rod comes off from the body section.

In one aspect of the compressor,
a through hole through which the terminal rod is inserted is provided in the body section,
an insulating glass portion containing glass is provided between an outer peripheral surface of the terminal rod and an inner peripheral surface of the through hole,
the bottom section of the insulating member has a through hole through which the terminal rod is inserted, and covers the body section, and
a diameter of the through hole in the bottom section of the insulating member is substantially identical to a diameter of the insulating glass portion.

Here, the case where the diameter of the through hole in the bottom section of the insulating member is substantially identical to the diameter of the insulating glass portion includes not only a case where the diameter of the through hole in the bottom section of the insulating member is identical to the diameter of the insulating glass portion, but also a case where the diameter of the through hole in the bottom section of the insulating member is slightly smaller than the diameter of the insulating glass portion, or the diameter of the through hole in the bottom of the insulating member is slightly larger than the diameter of the insulating glass portion.

Furthermore, in the case where the diameter of the through hole in the bottom section of the insulating member is slightly smaller than the diameter of the insulating glass portion, the value obtained by subtracting the diameter of the through hole in the bottom section of the insulating member from the diameter of the insulating glass portion is, for example, 2.0 mm or less.

Furthermore, in the case where the diameter of the through hole in the bottom section of the insulating member is slightly larger than the diameter of the insulating glass portion, the value obtained by subtracting the diameter of the insulating glass portion from the diameter of the through hole in the bottom section of the insulating member is, for example, 2.0 mm or less.

According to the aspect, it is possible to reduce the possibility that the terminal rod contacts the body section when the terminal rod comes off from the body section.

DETAILED DESCRIPTION OF EMBODIMENT(S)

Hereinafter, an illustrated embodiment will be described in detail. Note that in the drawings, identical reference numerals represent identical parts.

Figure 1:
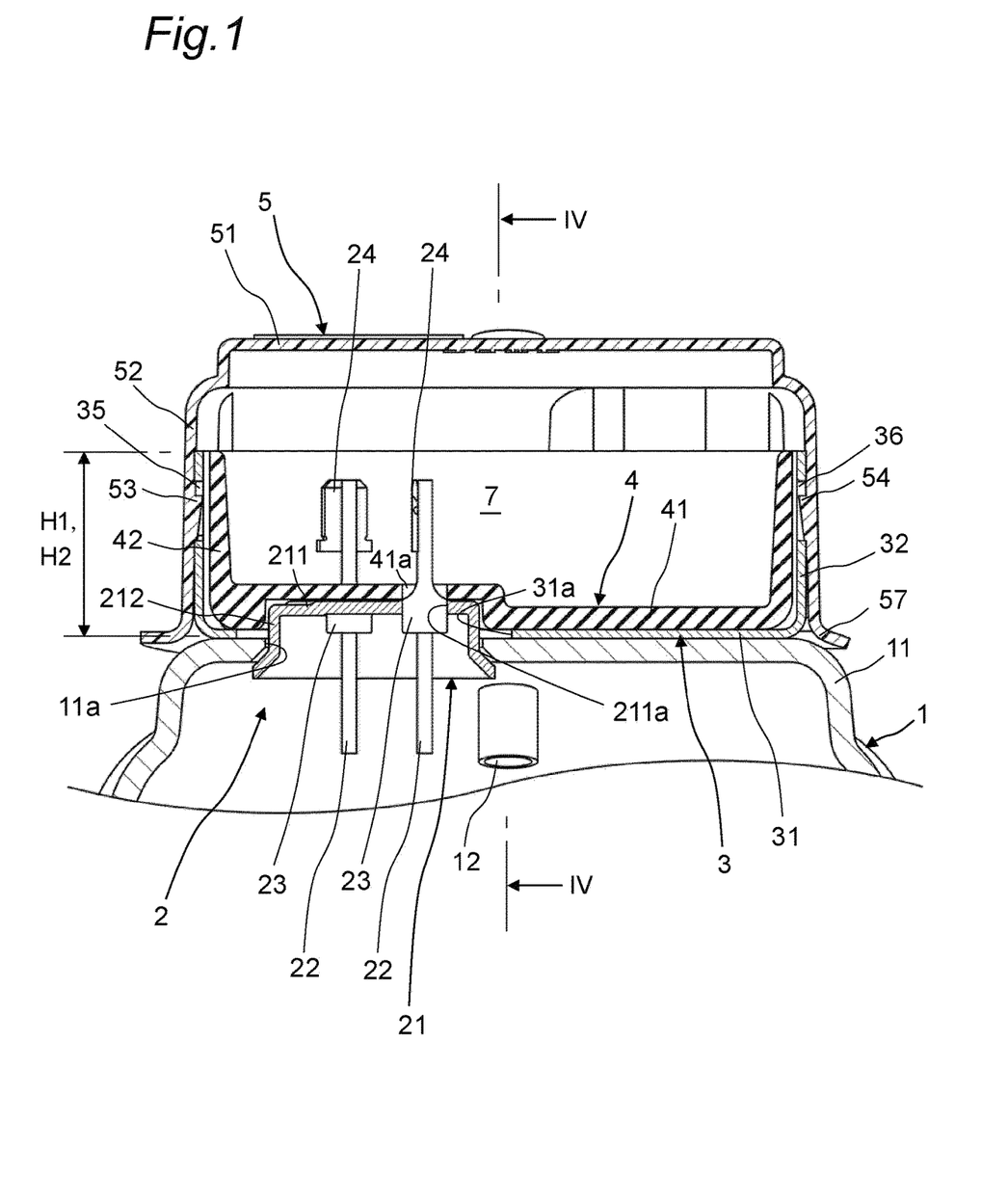
FIG. 1 is a partial sectional view of a compressor according to an embodiment.
Figure 2:
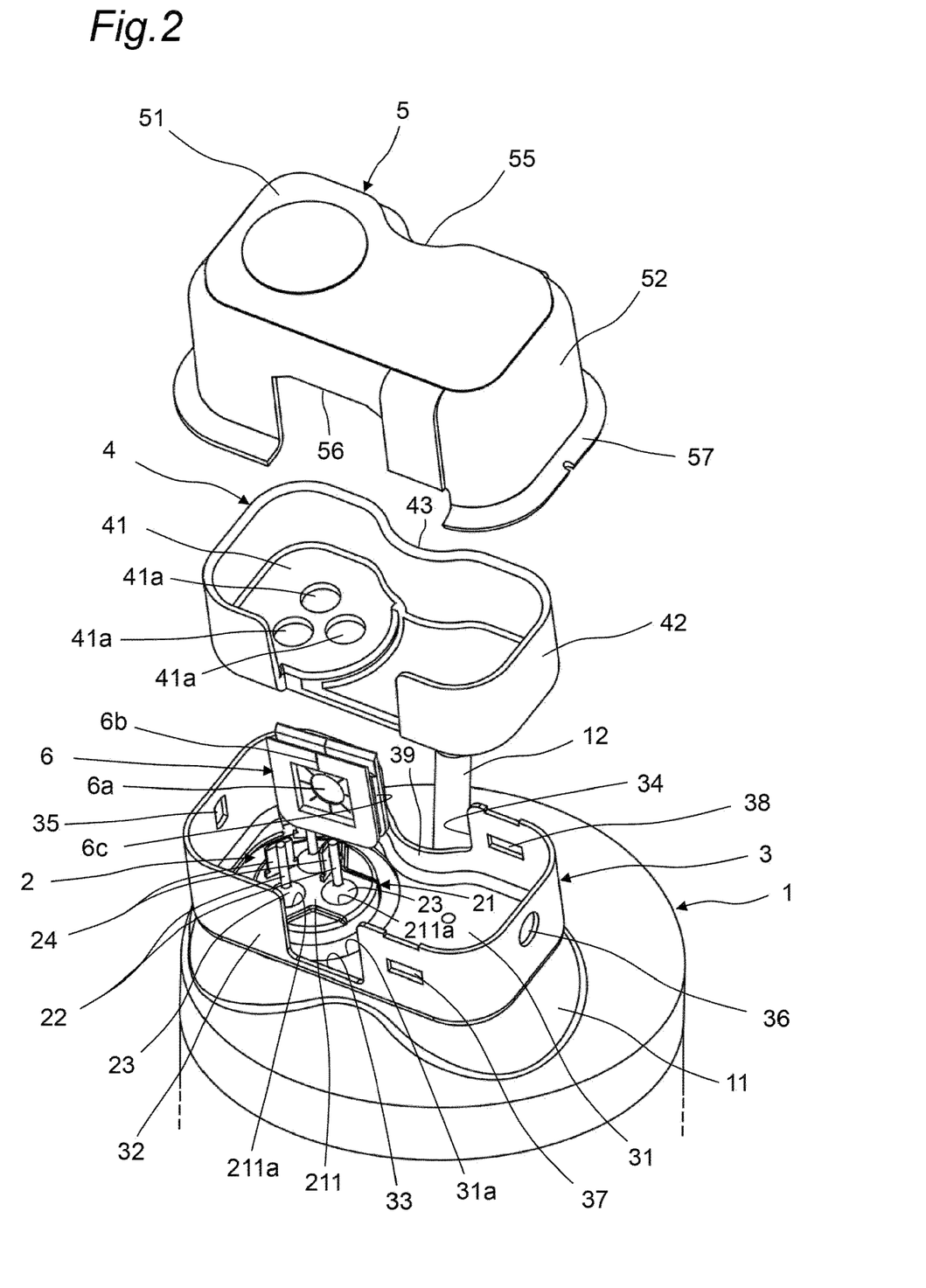
FIG. 2 is an exploded perspective view of part of the compressor.

FIG. 1 is a view schematically illustrating a cross section of an upper portion of a compressor according to an embodiment of the present disclosure, taken along a vertical plane. FIG. 2 is a view illustrating a state in which the upper portion of the compressor is disassembled, as viewed obliquely from above.

As illustrated in FIGS. 1 and 2, the compressor includes a hermetic container 1 that contains, for example, a metal, a terminal 2 that is provided to the hermetic container 1, a terminal guard 3 that contains, for example, a metal, a rubber member 4, and a terminal cover 5. Note that the hermetic container 1 is an example of a casing. The rubber member 4 is an example of an insulating member.

Figure 4:
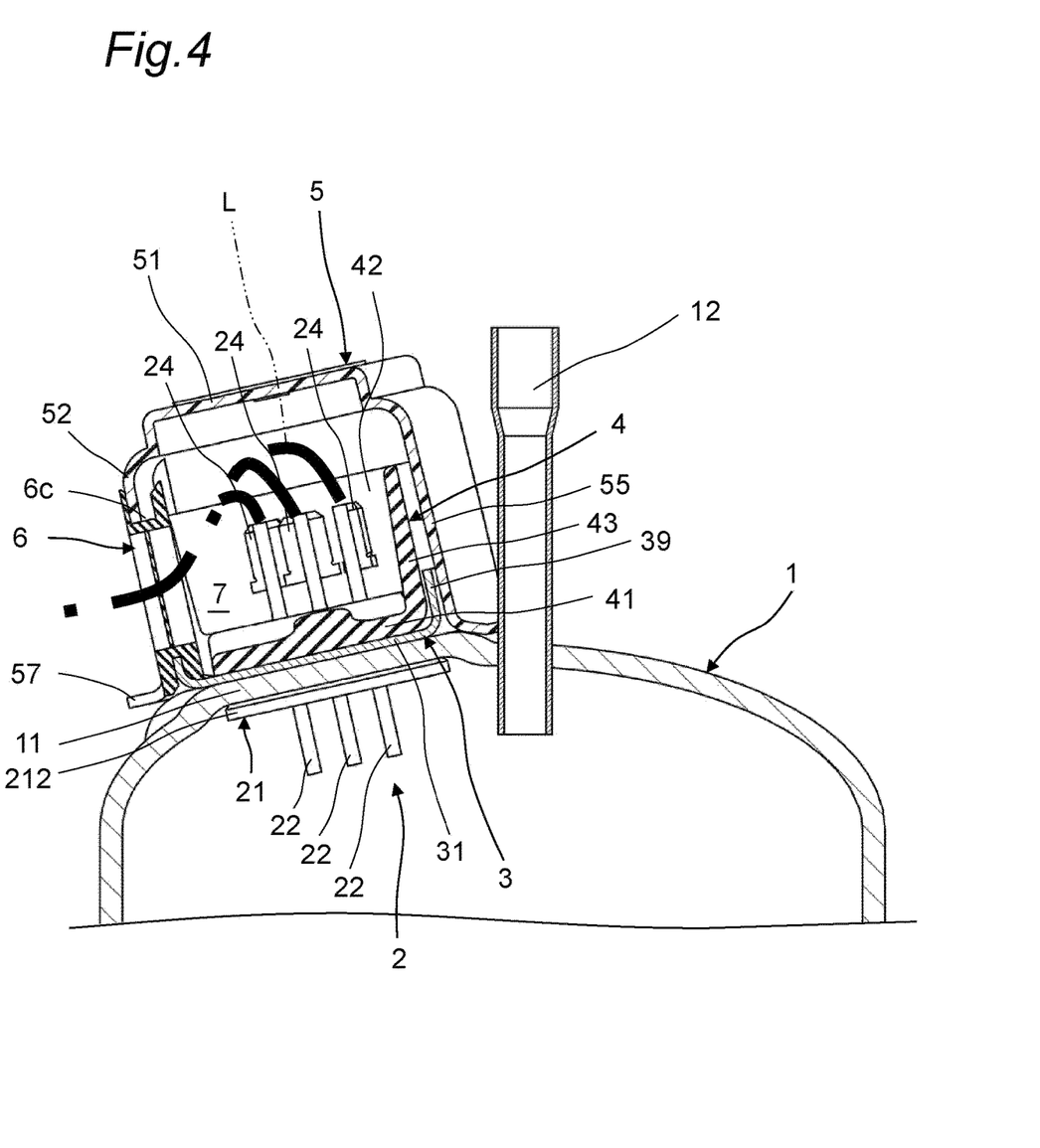
FIG. 4 is a sectional view taken along line IV-IV in FIG. 1.

The upper portion of the hermetic container 1 is curved so as to project to the outside (see FIG. 4). A raised portion 11 to which the terminal 2 is mounted is provided in the upper portion of the hermetic container 1. A compression mechanism unit (not illustrated) is disposed in the lower area of the hermetic container 1. In contrast, a motor (not illustrated) that drives the compression mechanism unit is disposed in the upper area of the hermetic container 1. When this motor drives the compression mechanism unit, a high-pressure fluid (for example, a refrigerant) compressed by the compression mechanism unit fills the hermetic container 1.

A discharge pipe 12 is inserted near the center of the upper portion of the hermetic container 1. The discharge pipe 12 extends in the vertical direction and guides the high-pressure fluid in the hermetic container 1 to the outside of the hermetic container 1.

The terminal 2 is a hermetic terminal (airtight terminal). More specifically, the terminal 2 includes a body section 21 that contains, for example, a metal, and, for example, three terminal rods 22 that are inserted through the body section 21.

For example, the body section 21 contains a metal material and is formed into a container shape. The body section 21 is fitted into a through hole 11a of the raised portion 11 and then fixed to a peripheral edge portion of the through hole 11a by, for example, welding. At this time, part of the body section 21 projects above the upper surface of the raised portion 11, and a step is formed between the upper end surface of the body section 21 and the outer surface of the raised portion 11.

The body section 21 includes a base section 211 having a disc shape and provided on the upper end side of the body section 21. A through hole 211a through which the terminal rod 22 is inserted is formed in the base section 211. The gap between the outer peripheral surface of the terminal rod 22 and the inner peripheral surface of the through hole 211a is filled with an insulating glass portion 23 containing glass. The insulating glass portion 23 fixes the terminal rod 22 to the body section 21 and insulates the body section 21 from the terminal rod 22.

The body section 21 further includes a cylindrical section 212 whose upper end is continuous to the base section 211. The diameter of the lower end portion of the cylindrical section 212 increases as proceeding to the inner side of the hermetic container 1. That is, the cylindrical section 212 is formed so that the lower end portion thereof engages with the peripheral edge portion of the through hole 11a. As a result, it is possible to reduce the possibility that the body section 21 comes off from the hermetic container 1 when pressure is applied from the fluid inside the hermetic container 1.

A current from a power source (not illustrated) outside the hermetic container 1 flows through the terminal rod 22. The terminal rod 22 has one end portion located outside the hermetic container 1 and the other end portion located inside the hermetic container 1. A terminal plate 24 provided at the one end portion of the terminal rod 22 is electrically connected to the power source via wiring L (illustrated in FIG. 4). A current from the power source flows through the terminal rod 22 and then is supplied to the motor through wiring (not illustrated) in the hermetic container 1. Note that the material of each of the terminal rod 22 and the terminal plate 24 may be any material that has conductivity.

The terminal guard 3 is provided outside the hermetic container 1 so as to surround the terminal 2. More specifically, the terminal guard 3 includes a bottom plate 31 and a side wall 32 extending upward from a peripheral edge portion of the bottom plate 31.

A through hole 31a through which the body section 21 is inserted is formed in the bottom plate 31. The diameter of the through hole 31a is set to be larger than the diameter of the upper end portion of the cylindrical section 212. Thus, when the body section 21 is inserted into the through hole 31a of the bottom plate 31, a gap is generated between the outer peripheral surface of the upper end portion of the cylindrical section 212 and the inner peripheral surface of the through hole 31a.

The side wall 32 is disposed so as to face the terminal rod 22 in the radial direction. That is, the side wall 32 is located on a lateral side of the terminal rod 22. First and second cutouts 33 and 34 and first to fourth through holes 35 to 38 are formed in the side wall 32. A concave portion 39 that is recessed inward is provided in a portion of the side wall 32 on a discharge pipe 12 side. The concave portion 39 is located under the second cutout 34 and is located on a lateral side of the discharge pipe 12.

A closing member 6 that contains, for example, heat resistant rubber is mounted to the first cutout 33. The closing member 6 has a through hole 6a through which the wiring L is inserted and a cut 6b. The cut 6b extends from one side of the outer peripheral edge of the closing member 6 to the through hole 6a. As a result, it is possible to insert part of the wiring L into the through hole 6a through the cut 6b.

Further, a groove 6c is formed in a peripheral edge portion of the closing member 6 over the entire circumference. The first cutout 33 is fitted into the groove 6c, and the closing member 6 is mounted to the terminal guard 3.

The rubber member 4 is disposed in the terminal guard 3. The rubber member 4 includes a bottom section 41 and a side section 42 integrally provided in an erected manner on a peripheral edge portion of the bottom section 41. The rubber member 4 contains silicon rubber so that the thickness thereof is, for example, 3.0 mm.

The bottom section 41 covers an area other than the through hole 211a of the body section 21 and an area around the body section 21. A through hole 41a through which the terminal rod 22 is inserted is formed in the bottom section 41. The diameter of the through hole 41a is set to be identical to the diameter of the insulating glass portion 23. That is, only the insulating glass portion 23 is exposed from the through hole 41a. The diameter of the through hole 41a is set to be slightly smaller than the maximum width (the maximum length in the direction parallel to the radial direction of the terminal rod 22) of the terminal plate 24 of the terminal 2. At this time, the value obtained by subtracting the diameter of the through hole 41a from the maximum width of the terminal plate 24 of the terminal 2 is, for example, is 0.8 mm or less.

The bottom section 41 is formed along the upper surface of the body section 21 and the upper surface of the bottom plate 31 of the terminal guard 3. As a result, it is possible to suppress rattling of the rubber member 4 when the rubber member 4 is disposed in the terminal guard 3.

The side section 42 has a height H1 identical to a height H2 of the side wall 32 of the terminal guard 3, and covers most of the inner surface of the side wall 32 of the terminal guard 3. At this time, a gap is formed over the entire circumference between the outer surface of the side section 42 and the inner surface of the side wall 32. Note that each of the heights H1 and H2 means the height with respect to the surface (the outer surface of the raised portion 11) on which the terminal guard 3 is to be mounted.

A concave portion 43 that is recessed inward is provided in a portion of the side section 42 on a discharge pipe 12 side. The rubber member 4 is disposed in the terminal guard 3 so that the concave portion 43 faces the concave portion 39 of the terminal guard 3. At this time, part of the concave portion 43 of the rubber member 4 is exposed from the second cutout 34 of the terminal guard 3 and faces the discharge pipe 12 in the radial direction (see FIG. 3).

The compressor further includes a terminal chamber 7 defined by the hermetic container 1 and the terminal guard 3. 90% or more of the surface area of a metal portion facing the terminal chamber 7 is covered with the rubber member 4. Note that the metal portion does not include the terminal rods 22.

The terminal cover 5 includes a top section 51 and a side section 52 extending downward from a peripheral edge portion of the top section 51, and covers the terminal 2, the terminal guard 3, and the rubber member 4. The terminal cover 5 contains nylon 66 so as to have a thickness of 1.5 mm, for example. Note that the terminal cover 5 preferably complies with the UL94-5VA standard.

First and second raised portions 53 and 54 which are inserted into the first and second through holes 35 and 36 are formed on the inner peripheral surface of the side section 52. Third and fourth raised portions (not illustrated) which are inserted into the third and fourth through holes 37 and 38 are provided on other portions of the inner peripheral surface of the side section 52.

A concave portion 55 that is recessed inward is provided in a portion of the side section 52 on a discharge pipe 12 side. The concave portion 55 faces the discharge pipe 12 in the radial direction when the terminal cover 5 covers the terminal 2 and the like. At this time, the concave portion 55 is located between the concave portion 39 of the terminal guard 3 and the discharge pipe 12.

A cutout 56 is provided in a portion of the side section 52 on the side opposite to the discharge pipe 12. When the terminal cover 5 covers the terminal 2 and the like, the closing member 6 is exposed from the cutout 56.

The terminal cover 5 includes a flange section 57 that laterally projects from the lower end portion of the side section 52. The lower end of the flange section 57 is disposed below the surface on which the terminal guard 3 is to be mounted.

Figure 3:
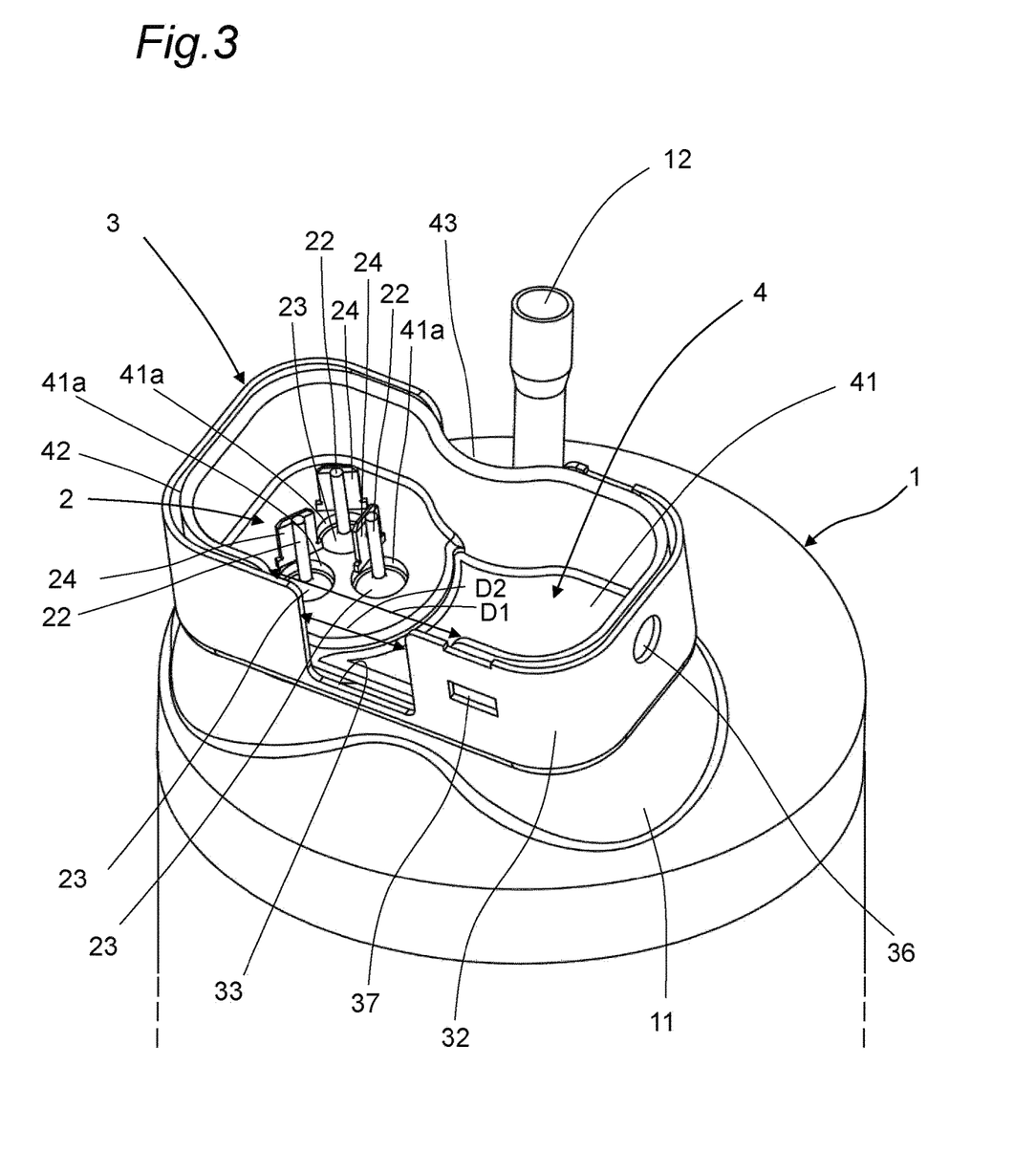
FIG. 3 is a perspective view of a terminal of the compressor and a peripheral portion thereof.

FIG. 3 is a view illustrating a state in which the rubber member 4 is disposed in the terminal guard 3 as viewed obliquely from above.

The side section 42 of the rubber member 4 is not provided over the entire circumference of the peripheral edge portion of the bottom section 41. The area without the side section 42 faces the first cutout 33 of the terminal guard 3 when the rubber member 4 is disposed in the terminal guard 3. At this time, a width D1 of the area without the side section 42 is greater than a width D2 of the first cutout 33. Therefore, only the area adjacent to the first cutout 33 on the inner surface of the side wall 32 of the terminal guard 3 is exposed without being covered by the side section 42. Note that each of the widths D1 and D2 means the length in the direction along the edge portion on the side opposite to the discharge pipe 12 in the peripheral edge portion of the bottom section 41.

FIG. 4 is a sectional view taken along line IV-IV in FIG. 1.

The surface on which the terminal guard 3 is to be mounted is inclined with respect to the horizontal direction. Therefore, when the terminal guard 3 is mounted on the surface on which the terminal guard 3 is to be mounted, a portion on a closing member 6 side is lower than a portion of on a discharge pipe 12 side on the bottom plate 31 of the terminal guard 3.

According to the compressor configured as described above, the side section 42 of the rubber member 4 covers the inner surface of the side wall 32 of the terminal guard 3. Therefore, the side section 42 is located inside the terminal guard 3 and not located outside the terminal guard 3. Therefore, even if, for example, water flows near the side wall 32 of the terminal guard 3 on the outside of the terminal guard 3, the water is not retained by the upper end portion of the side section 42 of the rubber member 4. As a result, it is possible to reduce the risk that the water enters the inside of the terminal guard 3 from the outside to contact the terminal. That is, it is possible to reduce the risk of a short-circuit in the terminal 2.

Further, the side section 42 of the rubber member 4 covers the inner surface of the side wall 32 of the terminal guard 3. Therefore, even if the terminal rod 22 comes off from the body section 21 and the entire terminal rod 22 is located in the terminal chamber 7, it is possible to reduce the possibility that the terminal rod 22 contacts the inner surface of the side wall 32 of the terminal guard 3. Therefore, it is possible to suppress generation of sparks due to contact between the terminal rod 22 and the inner surface of the side wall 32 of the terminal guard 3.

Further, in the rubber member 4, since the side section 42 is provided integrally with and erected on the peripheral edge portion of the bottom section 41, there is no gap between the bottom section 41 and the side section 42. Therefore, even if, for example, water enters the inside of the terminal guard 3, it is possible to prevent the water from entering the inside of the rubber member 4. As a result, the effect of reducing the risk of a short circuit in the terminal 2 can be enhanced.

Furthermore, the height H1 of the side section of the rubber member 4 is identical to the height H1 of the side wall of the terminal guard 3. Therefore, even if the terminal rod 22 moves toward the side wall 32 of the terminal guard 3 when the terminal rod 22 comes off from the body section 21, the possibility that the terminal rod 22 contacts the inner surface of the side wall 32 of the terminal guard 3 can be surely greatly reduced.

Furthermore, when the terminal rod 22 comes off from the body section 21, even if the terminal rod 22 moves in various directions in the terminal chamber 7, since 90% or more of the surface area of the metal portion facing the terminal chamber 7 is covered with the rubber member 4, the possibility that the terminal rod 22 contacts the metal portion can be reduced.

Moreover, since the diameter of the through hole 41a of the bottom section 41 of the rubber member 4 is set to be identical to the diameter of the insulating glass portion 23, it is possible to reliably cover the area of the body section 21 other than the through hole 211a. Therefore, it is possible to reduce the possibility of contacting the area of the body section 21 other than the through hole 211a when the terminal rod 22 comes off from the body section 21.

Even if water enters the inside of the terminal guard 3, since the bottom plate 31 of the terminal guard 3 is inclined such that the portion on the closing member 6 side is lower than the portion on the discharge pipe 12 side, the water can be discharged to the outside of the terminal guard 3 from a gap such as the through hole 6a, the through hole 6a, or the like.

In the above-described embodiment, a gap is formed over the entire circumference between the side wall 32 of the terminal guard 3 and the side section 42 of the rubber member 4. However, for example, the gap may not be formed. For example, at least part of the side section 42 of the rubber member 4 may be in close contact with the side wall 32 of the terminal guard 3.

In the above-described embodiment, the height of the side section 42 of the rubber member 4 is identical to the height of the side wall of the terminal guard 3. However, for example, the height of the side section 42 may be higher than the height of the side wall of the terminal guard 3. In this case, the height of the side wall of the terminal guard 3 can be increased up to the height at which the side wall contacts the terminal cover 5.

In the above-described embodiment, the height of the side section 42 of the rubber member 4 is identical to the height of the side wall of the terminal guard 3. However, for example, the height of the side section 42 may be slightly lower than the height of the side wall of the terminal guard 3 or may be a little higher than the height of the side wall of the terminal guard 3 due to, for example, manufacturing error. In such a case, the value obtained by subtracting the height of the side wall of the terminal guard 3 from the height of the side section 42 of the rubber member 4 falls within a range of, for example, −1.6 mm to 1.0 mm.

In the above-described embodiment, the terminal plate 24 is provided at the one end portion of the terminal rod 22. However, for example, the terminal plate 24 may not be provided at the one end portion of the terminal rod 22. In such a case, for example, the diameter of the through hole 41a of the bottom section 41 of the rubber member 4 may be equal to or larger than the diameter of the insulating glass portion 23 or equal to or less than the diameter of the terminal rod 22.

In the above-described embodiment, for example, the diameter of the through hole 41a in the bottom section 41 of the rubber member 4 may be set to be identical to the maximum width of the terminal plate 24 of the terminal 2, or slightly smaller than the maximum width of the terminal plate 24 of the terminal 2. In such a case, the value obtained by subtracting the maximum width of the terminal plate 24 of the terminal 2 from the diameter of the through hole 41a is, for example, is 0.0 mm or more and 0.8 mm or less.

In the above-described embodiment, the diameter of the through hole 41a in the bottom section 41 of the rubber member 4 is identical to the diameter of the insulating glass portion 23. However, for example, the diameter of the through hole 41a may be slightly smaller than the diameter of the insulating glass portion 23, or may be slightly larger than the diameter of the insulating glass portion 23 due to manufacturing error, or the like. In such a case, the value obtained by subtracting the diameter of the insulating glass portion 23 from the diameter of the through hole 41a falls within the range of −2.0 mm to 2.0 mm, for example.

In the above-described embodiment, the bottom section 41 of the rubber member 4 covers the area other than the through hole 211a of the body section 21 and the area around the body section 21. However, for example, the bottom section 41 may cover only the area around the body section 21.

The foregoing description concerns a specific embodiment of the present disclosure; however, the present disclosure is not limited to the above-described embodiment and modifications, and various modifications and variations may be made within the scope of the present disclosure. For example, an appropriate combination of the configurations described in the above-described embodiment and modifications may be regarded as an embodiment of the present disclosure.

Examples of a compressor to which a terminal structure including the rubber member 4 and the like is applied include a scroll compressor, a rotary compressor, a swing compressor, and the like. That is, the terminal structure can be applied to various types of compressors.

Further, for example, the compressor may be a so-called one-cylinder compressor or a so-called two-cylinder compressor.

What is claimed is:

1. A compressor comprising:
a casing;
a terminal provided to the casing, the terminal including a body section and a terminal rod inserted through the body section;
a terminal guard provided outside the casing to surround the terminal, the terminal guard containing metal and including a side wall facing the terminal rod in a radial direction; and
an insulating member disposed inside the terminal guard, the insulating member including
a bottom section covering an area around the body section, and
a side section integrally provided in an erected manner on a peripheral edge portion of the bottom section, the side section covering an inner surface of the side wall of the terminal guard.

2. The compressor according to claim 1, wherein
a terminal chamber is defined by the casing and the terminal guard,
90% or more of a surface area of a metal portion that faces the terminal chamber is covered with the insulating member.

3. The compressor according to claim 1, wherein
a height of the side section of the insulating member is substantially identical to a height of the side wall of the terminal guard.

4. The compressor according to claim 1, wherein
the terminal guard includes a bottom plate in which a through hole is formed, and
the body section is inserted through the through hole.

5. A compressor comprising:
a casing;
a terminal provided to the casing, the terminal including a body section and a terminal rod inserted through the body section;
a terminal guard provided outside the casing to surround the terminal, the terminal guard including a side wall facing the terminal rod in a radial direction; and
an insulating member disposed inside the terminal guard, the insulating member including
a bottom section covering an area around the body section, and
a side section integrally provided in an erected manner on a peripheral edge portion of the bottom section the side section covering an inner surface of the side wall of the terminal guard,
a height of the side section of the insulating member being substantially identical to a height of the side wall of the terminal guard.

6. The compressor according to claim 5, wherein
a terminal chamber is defined by the casing and the terminal guard,
90% or more of a surface area of a metal portion that faces the terminal chamber is covered with the insulating member.

7. The compressor according to claim 5, wherein
the terminal guard includes a bottom plate in which a through hole is formed, and
the body section is inserted through the through hole.

8. A compressor comprising:
a casing;
a terminal provided to the casing, the terminal including a body section and a terminal rod inserted through the body section;
a terminal guard provided outside the casing to surround the terminal, the terminal guard including a side wall facing the terminal rod in a radial direction; and
an insulating member disposed inside the terminal guard, the insulating member including
a bottom section covering an area around the body section, and
a side section integrally provided in an erected manner on a peripheral edge portion of the bottom section, the side section covering an inner surface of the side wall of the terminal guard,
the terminal rod being inserted through a through hole, and the through hole is formed in the body section,
an insulating glass portion containing glass being provided between an outer peripheral surface of the terminal rod and an inner peripheral surface of the through hole,
the bottom section of the insulating member having, a through hole, the terminal rod being inserted through the through hole of the bottom section, and the bottom section covering the body section, and
a diameter of the through hole in the bottom section of the insulating member being substantially identical to a diameter of the insulating glass portion.

9. The compressor according to claim 8, wherein
a height of the side section of the insulating member is substantially identical to a height of the side wall of the terminal guard.

10. The compressor according to claim 8, wherein
a terminal chamber is defined by the casing and the terminal guard,
90% or more of a surface area of a metal portion that faces the terminal chamber is covered with the insulating member.

* * * * *